United States Patent [19]
Joshi et al.

[11] Patent Number: 6,006,017
[45] Date of Patent: *Dec. 21, 1999

[54] SYSTEM FOR DETERMINING THE FREQUENCY OF REPETITIONS OF POLLING ACTIVE STATIONS RELATIVE TO THE POLLING OF INACTIVE STATIONS

[75] Inventors: Abhay Joshi; Mete Kabatepe, both of Norwood; Lawrence W. Lloyd, Wrentham; John A. Perreault, Hopkinton; Stephen Schroeder, Stoughton, all of Mass.

[73] Assignee: Motorola Inc., Schaumburg, Ill.

[*] Notice: This patent is subject to a terminal disclaimer.

[21] Appl. No.: 08/432,749

[22] Filed: May 2, 1995

[51] Int. Cl.$^6$ .................................................. G06F 13/00
[52] U.S. Cl. ...................... 395/200.11; 370/449
[58] Field of Search ................ 395/200.01, 200.02, 395/200.03, 200.05, 200.06, 200.09, 200.11, 837, 838, 839, 866, 867, 182.02; 370/85.8, 95.2, 85.2, 60, 94.1, 95.1, 254, 449, 450, 451, 475

[56] References Cited

U.S. PATENT DOCUMENTS

| | | | |
|---|---|---|---|
| 4,680,753 | 7/1987 | Fulton et al. | 370/449 |
| 4,683,531 | 7/1987 | Kelch et al. | 395/289 |
| 4,763,323 | 8/1988 | Nelson et al. | 370/449 |
| 4,809,268 | 2/1989 | Tejima et al. | 370/346 |
| 4,829,297 | 5/1989 | Ilg et al. | 370/449 |
| 4,924,461 | 5/1990 | Amemiya et al. | 370/449 |
| 4,941,089 | 7/1990 | Fischer | 370/419 |
| 5,132,680 | 7/1992 | Tezuka et al. | 370/449 |
| 5,166,675 | 11/1992 | Amemiya et al. | 370/449 |
| 5,249,269 | 9/1993 | Nakao et al. | 395/200.06 |
| 5,297,144 | 3/1994 | Gilbert et al. | 370/346 |
| 5,359,602 | 10/1994 | Diaz et al. | 370/401 |

*Primary Examiner*—Moustafa M. Meky
*Attorney, Agent, or Firm*—Nancy R. Gamburd

[57] ABSTRACT

An apparatus and method to implement a hybrid contention and polling protocol for a communications or computer network is disclosed. Various apparatus and method embodiments of the invention employ specific polls from a primary station for polling identified secondary stations of the network which may be in an active state, general polls to any of a plurality of secondary stations of the network which may be in an unresponsive state to initiate contention access to the network, and general polls for collision resolution in the event that a plurality of secondary stations may simultaneously contend for network access. Various embodiments may also include frequency channel allocation for transmission and reception of data and other information within the network. The various procedures and apparatus disclosed may also be used to apply various polling parameters to optimize network performance.

71 Claims, 4 Drawing Sheets

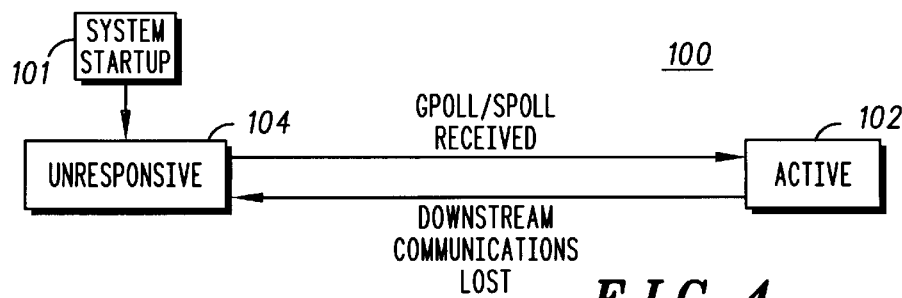
FIG.4
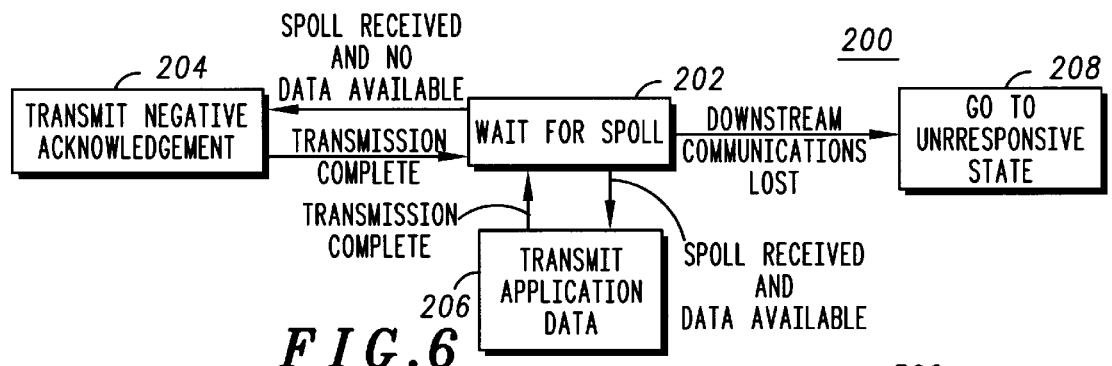
FIG.6
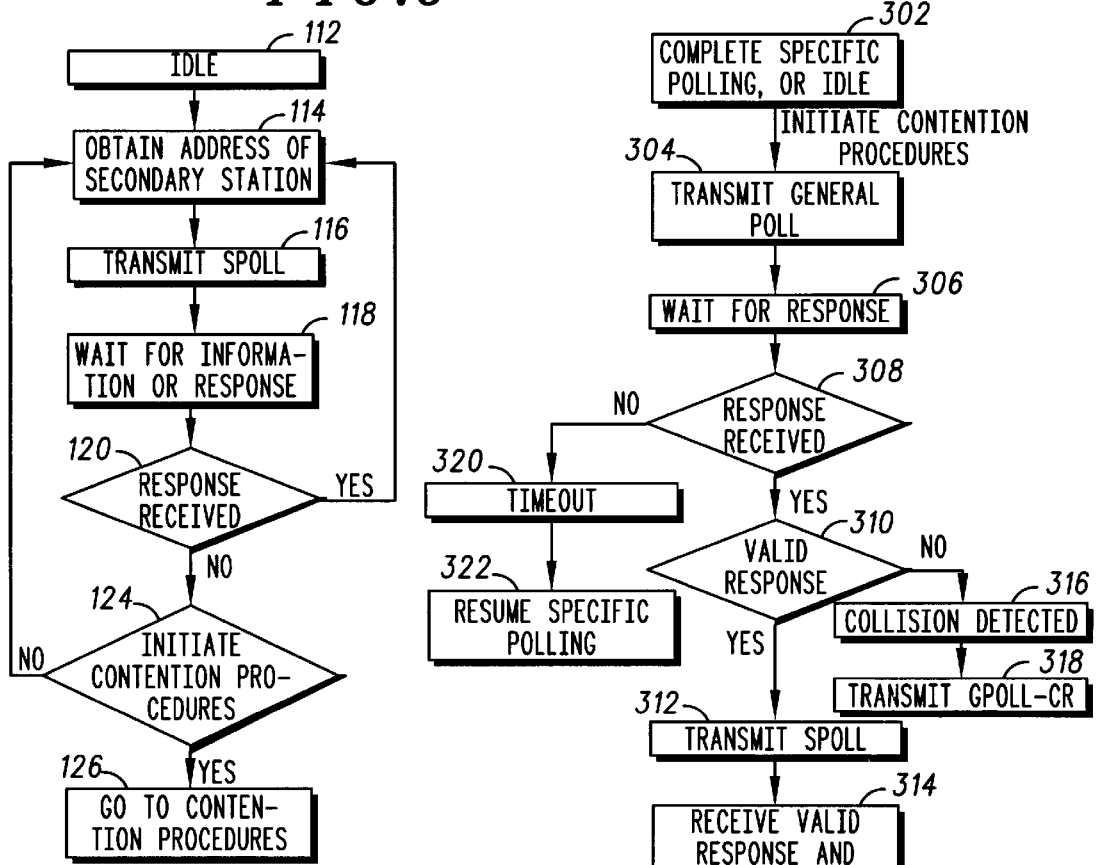
FIG.5
FIG.7

SYSTEM FOR DETERMINING THE FREQUENCY OF REPETITIONS OF POLLING ACTIVE STATIONS RELATIVE TO THE POLLING OF INACTIVE STATIONS

CROSS REFERENCE TO RELATED APPLICATIONS

This application is related to the following United States Patent Applications, incorporated by reference herein, as follows:

Ser. No. 08/433,905 Method And System For Providing Access By Secondary Stations To A Shared Transmission Medium filed May 2, 1995, now U.S. Pat. No. 5/596,577;

Ser. No. 08/433,877 Method And Apparatus For Multilink Polling filed May 2, 1995, still pending;

Ser. No. 08/433,878 Method And System For Management Of FrequencySpectrum Among Multiple Applications On A Shared Medium filed May 2, 1995, now U.S. Pat. No. 5,608,727;

Ser. No. 08/437,106 Method And Apparatus For A Hybrid Limited Contention And Polling Protocol filed May 5, 1995, still pending;

Ser. No. 08/433,876 System And Method For Hybrid Contention/Polling Protocol Collision Resolution Using A Collision Resolution Using A Depth First Search Technique filed May 2, 1995, still pending; and, Ser. No. 08/434,334 Method And System For Management Of Frequency Spectrum Among-Multiple Applications On A Shared Medium filed May 2, 1995, still pending.

FIELD OF THE INVENTION

This application relates to devices, methods and protocols for implementing, accessing and controlling communications and computer networks including, but not limited to, methods and apparatus relating to communications and computer networks employing contention access, polling access, or token ring access.

BACKGROUND OF THE INVENTION

Modern computer or other communications networks, typically involve a primary station or device, such as a file server, a personal computer, a computer workstation, a mainframe computer, a supercomputer, or any other type of computer, coupled or connected through a communications channel to a larger number of secondary stations or devices, such as data terminals, personal computers, workstations, or other computers. The communications channel may be any type or kind of transmission media, such as fiber optic cable, television cable or other coaxial cable, digital T1 or ISDN lines, twisted pair telephone lines, etc. The communication between the primary and secondary devices is typically bi-directional, with the primary station capable of transmitting information to and receiving information from each secondary station, and with each secondary station capable of transmitting information to and receiving information from the primary station. Secondary stations usually do not communicate directly with each other, but may communicate indirectly with each other through the primary station.

In many network environments, however, the network typically shares the transmission medium among several, many or all of the secondary stations or devices, rather than having a specific and dedicated transmission medium to each such individual secondary station or device. In such network environments in which such multiple secondary stations or devices share access to a transmission medium, a problem may be created in the event that more than one secondary station attempts to transmit information to the primary station during the same period of time. Accordingly, given the possibility that more than one device (primary or secondary) may be transmitting information on the medium simultaneously, there may then be the problem that such transmitted data collides or interferes with the other simultaneously transmitted data. Such "data collisions" typically result in the data of all of the transmitting stations becoming corrupted and useless.

Currently, in the prior art, there are two main types or categories of solutions to this potential data collision problem (and corresponding data corruption problem). The first, referred to as round robin access, involves a set of procedures wherein devices are allowed access to the medium in a sequential fashion, with no more than one device being permitted access to the medium at any one time. Round robin access, such as token ring access, may involve the passing of a token between peer stations. Only the station that has the token is permitted to transmit on the medium, thereby avoiding data collisions.

Another approach, referred to as polling, involves a single master or primary station controlling the access of slave, or secondary stations, to the transmission medium. The primary station controls the access of the secondary stations to the network medium by transmitting polls addressed to individual secondary stations in a sequential fashion. A secondary station, such as the first secondary station, is permitted to transmit on the shared medium only upon receiving a poll containing its specific, unique address or other means of identification. Upon completion of transmission, the primary station then transmits another poll to the second or next secondary station, and repeats the process until all secondary stations have been polled. The polling process then iterates or begins again with a poll to the first secondary station. By limiting transmission access to only the specific secondary station polled, data collisions may be avoided.

A second prior art solution, referred to as contention access, involves multiple secondary stations contending for the shared medium, often in an unordered and possibly random fashion. This contention access approach, however, assumes that data collisions may occur. Accordingly, protocols which provide shared access to a transmission medium using contention access also usually provide means for detecting that a collision has occurred, and means for resolving the transmission order among the contending secondary stations. These contention access protocols also include procedures and algorithms for retransmitting data subsequent to a collision, usually in such a manner as to reduce the likelihood of additional collisions.

A variety of such round robin and contention protocols, with applications to various network configurations or topographies, are discussed in A. Tanenbaum, *Computer Networks* (Prentice-Hall, Inc., Englewood Cliffs, N.J., 2d Ed. 1989).

A comparision of the performance of these two solutions indicates that contention access protocols generally perform well only under "lightly loaded" conditions, i.e., the devices sharing the medium have data available for transmission only infrequently, so that an excessive number of devices are not simultaneously contending for data transmission. As loading increases, however, the performance of these protocols may degrade due to the increased number of collisions. The time required for data transmission may increase significantly, as each collision further requires data retransmission, which may also result in additional collisions. As the data transmission load may continue to increase, networks employing contention access may simply cease to function, as the increased contention creates collisions indefinitely.

Round robin protocols, on the other hand, comparatively do not perform as well as contention protocols under lightly loaded conditions. Under conditions of a light data transmission load, these round robin protocols effectiviely waste significant transmission time due to the amount of time spent polling or passing tokens to stations which do not have any data available for transmission or which are unresponsive altogether. Protocols employing a polling discipline, by transmitting polls addressed to individual secondary stations in a sequential fashion, suffer performance degradation when a significant number of the secondary stations are unresponsive. The performance degradation comes about due to the time spent polling and waiting for responses from secondary stations which are not able to respond. Typically unresponsive secondary stations continue to be polled because the primary station has no knowledge of when an unresponsive secondary station may become able to respond. These protocols, however, may provide superior performance, compared to contention access protocols, under heavily loaded conditions, providing a sequential opportunity for each station to transmit without interfering and disabling collisions.

A need remains, therefore, for a single network communications protocol to have increased information transmission efficiency, such as reducing the time for and any time delays associated with information transmission, under both lightly loaded and heavily loaded conditions. In addition, needs continue to exist for such a single protocol to dynamically respond to potentially changing load conditions, from light to heavy and vice-versa, and to accomodate various user demand levels, from few to many users at any given time. A protocol should also meet these needs efficiently, by increasing transmission channel availability and decreasing the time required for effective information transmission.

BRIEF DESCRIPTION OF THE DRAWINGS

FIG. 4 is a flow chart illustrating various potential states of a secondary station of a preferred embodiment of the present invention.

FIG. 5 is a flow chart illustrating polling procedures for a primary station of a preferred embodiment of the present invention.

FIG. 6 is a flow chart illustrating specific polling procedures for a secondary station, in an active state, of a preferred embodiment of the present invention.

FIG. 7 is a flow chart illustrating contention access procedures for a primary station of a preferred embodiment of the present invention.

DETAILED DESCRIPTION OF THE PREFERRED EMBODIMENT

Figure 1:
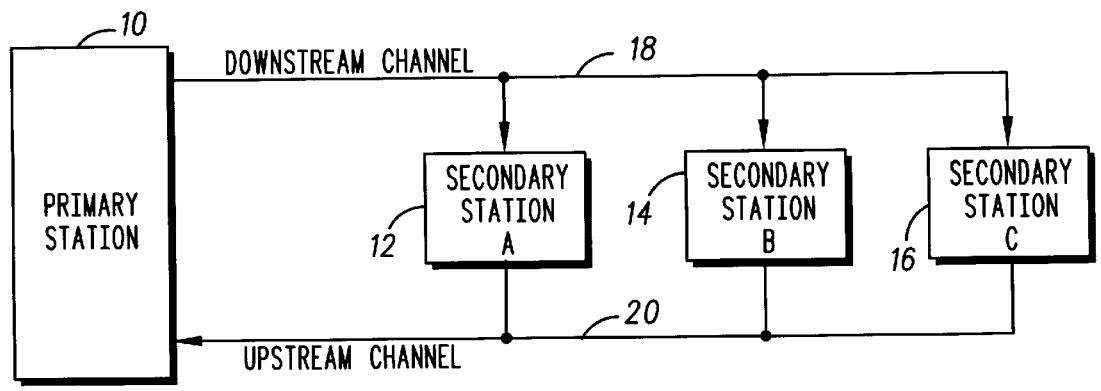
FIG. 1 is a block diagram illustrating an overall system configuration of an embodiment of the present invention.

The preferred embodiment of the invention disclosed herein provides a solution to the problem of performance degradation, under conditions of a light transmission load, caused by continually polling unresponsive secondary stations, typical of most polling protocols. In addition, the preferred embodiment of the invention described herein provides a solution to the various data collision problems encountered in typical contention protocols, by minimizing the amount of time required to contact unresponsive secondary stations and by confining and minimizing the effects of potential data collisions. As discussed in greater detail below, the preferred embodiment accomplishes these results, effectively and efficiently, by employing a novel hybrid protocol which dynamically utilizes various advantages or features of polling protocols with various advantages or features of contention protocols, in response to the various and potentially changing transmission load requirements or demands of the network. The preferred embodiment of the invention dynamically utilizes a polling discipline for controlling and providing network access to responsive, or active, secondary stations, and also uses a contention access discipline for controlling and providing network access by formerly unpolled and unresponsive secondary stations, in order to determine if any have become able to respond. In addition, the preferred embodiment provides for the majority of the network intelligence to reside in the primary station, thereby reducing the complexity and cost of the numerous secondary stations which may be incorporated in the network.

In the preferred embodiment of the present invention, secondary stations are considered to have two relevant states, and each secondary station will be in one state or the other state at any particular time, and may transfer or transition from one state to the other, and vice-versa, without further limitation. The first state, referred to as the unresponsive state, includes those secondary stations which may just be powering up and coming on line, or which have been quiescent and have otherwise not required network access or have not responded to network queries (because, for instance, the device has been powered down). The second state, referred to as an active state or as a responsive state, includes all those secondary stations which are not in an unresponsive state, for example, those secondary stations which have been on line and have been responding to network demands or queries, or which have been transmitting information.

As used herein, "network" or "networks" includes computer, networks, communications networks, or any other system for the transmission, reception, or other transfer of data or other information, such as video, graphics, text, etc., typically between and among two or more devices. "Data or other information" has a similarly broad interpretation, and may refer to any kind or type of information, such as video, graphics, sound, text, or any other material which might be encodeable and transmissable over a communications channel.

FIG. 1 is a block diagram illustrating an overall system configuration of an embodiment of the present invention. Referring to FIG. 1, a primary station 10 transmits data or other information to one or more secondary stations, identified as secondary station A 12, secondary station B 14, and secondary station C 16, on a transmission medium, referred to as a downstream channel 18. While three secondary stations are illustrated in FIG. 1 for ease of reference, it will be understood by those skilled in the art that many more secondary stations may be included within the network, numbering from the hundreds to the thousands. The various primary stations and secondary stations may be controller, processor or microprocessor embodiments, including any form or type of computers, such as mainframe computers, personal computers, workstations, supercomputers, or file servers, or may be other devices such as data terminals.

Also referring to FIG. 1, the downstream channel 18 and the upstream channel 20 may be separate and distinct transmission media, or may be physically combined within one transmission medium, such as a coaxial cable, a fiber optic cable, a telephone line, a twisted pair line, or a digital line, and are referred to as separate channels solely to indicate the direction of the flow of transmitted information, namely, downstream from the primary station 10 to the various secondary stations 12, 14 and 16, and upstream from these various secondary stations 12, 14 and 16 to the primary station 10. In the preferred embodiment, the primary station 10 is the only device permitted to transmit in the downstream direction, i.e., on the downstream channel 18. Secondary stations 12, 14 and 16 transmit data and other information to the primary station 10 on the same transmission medium or a second transmission medium in the upstream direction, referred to as an upstream channel 20. Secondary stations may not be capable of transmitting data directly to another secondary station, but would first transmit upstream to the primary station 10, which would transmit or retransmit the information downstream to the appropriately identified secondary station.

Continuing to refer to FIG. 1, all secondary stations 12, 14 and 16 typically share the upstream channel. In order to prevent simultaneous or overlapping transmissions on the upstream channel 20 from corrupting data, in accordance with the present invention, only one such secondary station is permitted to transmit data at any one time. The primary station 10 controls which secondary station has access to and is permitted to transmit data on the upstream channel 20 by means of transmitting, on the downstream channel 18, special frames of information or data, referred to as specific polls, uniquely addressed to an identifiable secondary station among the plurality of secondary stations. The specific poll may be comprised of any predetermined, known or otherwise defined sequence or grouping of bits, bytes, words or data packet, which is recognizable by a secondary station as the defined or known sequence forming the specific poll. Upon receiving a specific poll on the downstream channel 18, with a singular, distinctive or otherwise unique address that distinguishes or identifies a particular secondary station from the possibly numerous, plurality of secondary stations, or which a secondary station otherwise recognizes as a unique identification, the identified secondary station is then allowed access to transmit on the upstream channel 20. The actual amount of time that a secondary station is permitted access for transmission on the upstream channel may be determined by other means and, for example, may be determined by various parameters such as current activity or usage levels, network size, cost, etc. In addition, as discussed in greater detail with reference to alternative embodiments, various channel frequencies may be allocated by the primary station, rather than or in addition to transmission time allocations.

Figure 2:
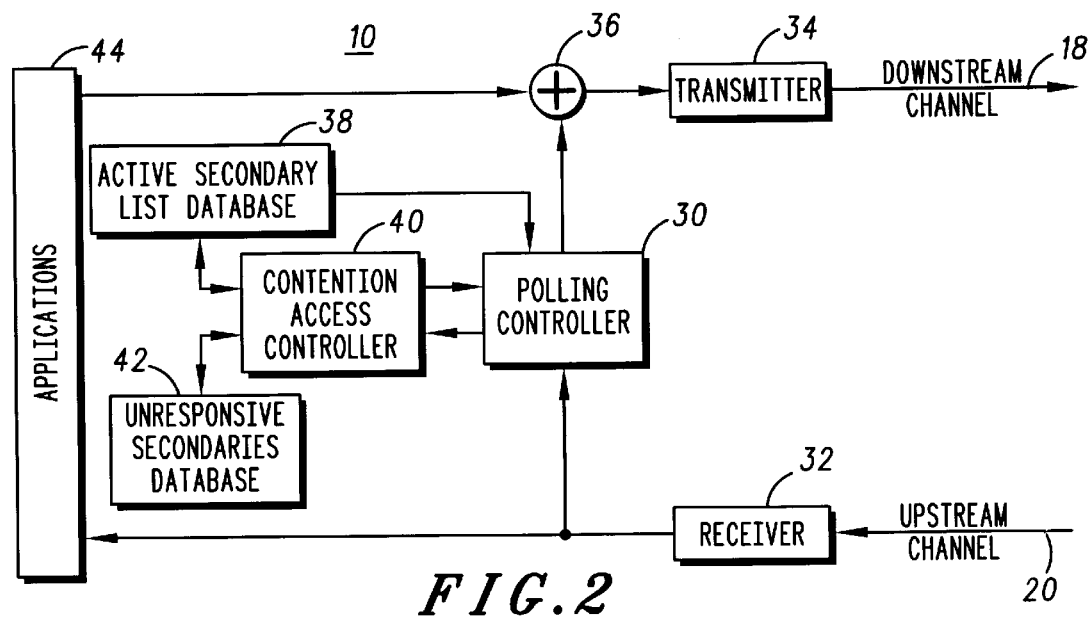
FIG. 2 is a block diagram illustrating a primary station of an embodiment of the present invention.

FIG. 2 is a block diagram illustrating a primary station of an embodiment of the present invention. Referring to FIG. 2, a primary station 10 includes a polling controller 30, a memory (such as RAM) or database of active secondary stations 38, a database of unresponsive secondary stations 42, and a contention access controller 40. The polling controller 30 and the contention access controller 40 may or may not be embodied within or as the same device, for example, single or multiple microcontrollers or microprocessors. The polling controller 30 and the contention access controller 40, or a secondary station, may also contain a time delay circuit for determining and implementing a delay period or backoff time, discussed in detail below. Similarly, the databases 38 and 42 may be embodied together or separately in various memory circuits, such as RAM, EPROMs, etc., which also may be part of a larger memory capacity of, for example, a computer. The contention access controller 40 determines or controls when to perform specific polling and when to allow contention access by issuing commands to the polling controller 30. By examing the active secondary station database (or list) 38 and the unresponsive secondary station database (or list) 42, the contention access controller 40 may dynamically adjust the frequency and duration of contention access in order to optimize overall performance. The polling controller 30 transmits polls, both specific polls and general polls (discussed below), to one or more secondary stations on the downstream channel 18 via a transmitter 34. Also transmitted from the primary station on the downstream channel may be various applications, data or information, such as database search results, bulletin board materials, a graphic image, video, sound, a computer program, or any other network application. Such myriad application information, therefore, will be generally referred to as "information" or "applications", from the applications block 44 of the primary station 10. Those skilled in the art will appreciate that the applications block of the network may itself be a microprocessor, a computer, or another network access device.

Continuing to refer to FIG. 2, a summer, switch or multiplexer 36 is used to combine, mix, or sequence the various polls with applications information or data, which also may be being sent by the applications block 44 on the downstream channel 18 to secondary stations. Data transmitted by secondary stations on the upstream channel 20 is received or accepted by a receiver 32 in the primary station 10. The receiver 32 may also be combined with the transmitter 34 as a unitary transceiver. In addition, depending upon the type of transmission medium, such as analog or digital, the transmitter and receiver may be various types of analog or digital modems or terminal adapters. The polling controller 30 also may examine all received data or other information as it is transmitted by or flows from the receiver 32 to the applications block 44.

Figure 3:
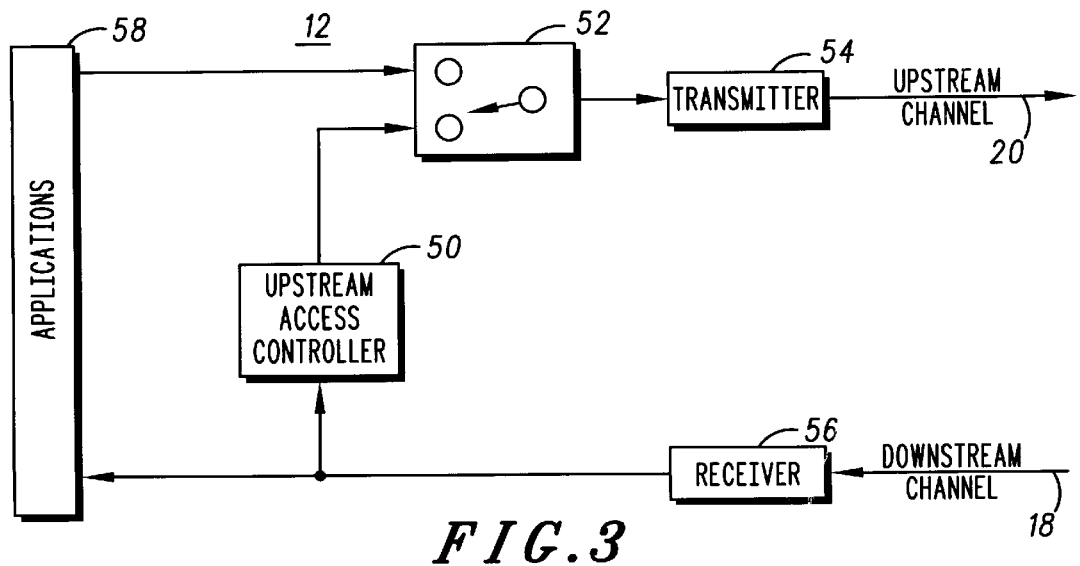
FIG. 3 is a block diagram illustrating a secondary station of an embodiment of the present invention.

FIG. 3 is a block diagram illustrating a secondary station of an embodiment of the present invention. Referring to FIG. 3, a secondary station 12 includes an upstream access controller 50, which examines all information or data received on the downstream channel 18, from the primary station, via a receiver 56. Some of the received information may be polls, general or specific, while other received information may be applications data, such as results from a requested database search, destined for the secondary station applications block 58. When the secondary station receives a specific poll having an address identifying or otherwise recognized by the secondary station, the multiplexer ("mux") or switch 52 will be switched to couple or connect the applications information to the transmitter if the specific poll received is requesting that application data be transmitted to the primary station in response to the poll. If information other than applications data or applications information, such as a control message, is to be sent in response to the received poll, then the mux 52 will be switched to connect the upstream access controller to the transmitter, to transmit, for example, information consisting of a negative acknowledgement indicating that the secondary station has no applications information or data ready or needed for upstream transmission. After the mux 52 has been switched to the appropriate position, the transmitter 54 may be activated and information or data transmission on the upstream channel 20 may commence. When the transmission is complete, the transmitter 54 may be deactivated.

The preferred embodiment of the invention is a hybrid protocol, having both method and apparatus embodiments, in which a primary station employs a polling discipline for controlling the access of one or more active secondary stations to a shared transmission medium, the upstream channel, and also employs a contention discipline for controlling the access of unresponsive secondary stations to the same upstream channel. FIG. 4 is a flow chart illustrating various potential states of a secondary station of a preferred embodiment of the present invention. As shown in FIG. 4, a secondary station 100 may be in either of two states, active 102 or unresponsive 104. A secondary station places itself in the unresponsive state 104 upon system startup, block 101. Once a secondary station transitions or changes from the unresponsive state 104 to the active state 102 upon receipt of a general poll followed by a specific poll, it will return to the unresponsive state 104 if it has determined that it has lost communication with the primary station.

FIG. 5 is a flow chart illustrating polling procedures for a primary station of a preferred embodiment of the present invention. The polling discipline makes use of several types of polling frames, the first polling frame referrred to as a specific poll discussed above, abbreviated as "SPoll", and another type of polling frame referred to as a general poll, abbreviated as "GPoll". The primary station 10 controls which secondary stations in an unresponsive state may have access to and subsequently be permitted to transmit data on the upstream channel 20 by means of transmitting, on the downstream channel 18, special frames of information or data, referred to as general polls, to the various secondary stations among the plurality of secondary stations. The general poll also may be comprised of any predetermined, known or otherwise defined sequence or grouping of bits, bytes, words or data packet, which is recognizable by a secondary station as the defined or known sequence forming the general poll. The primary station maintains a first database containing a list of all active secondary stations, referred to as the active database, and a second database containing a list of all unresponsive secondary stations, referred to as the unresponsive database. These databases may be contained in any form of memory, integrated circuit, any other memory circuitry, such as RAM, and may be separate or combined in the same physical device. The contention access controller in the primary station maintains these databases and coordinates the dynamic utilization of the two access disciplines, polling and contention.

Referring to FIG. 5, the primary station may begin with or periodically enter or return to an idle state 112. When the contention access controller in the primary station commands the polling controller to initiate polling of active devices, the polling controller will obtain the identifications ("IDs") or addresses of the active secondary stations from the active secondary database list, step 114. As each address is obtained from the database, the polling controller will transmit, on the downstream channel, a specific poll containing the address of the active secondary station, step 116. Following the transmission of the SPoll, the primary station will wait for information, such as a response, from the secondary station, step 118. As discussed in greater detail below, after receiving a response from a secondary station, the primary station may resume specific polling, step 120, returning to step 114 to receive another identification and transmit another SPoll. If information such as "no response" has been received after a predetermined period of time, however, the primary station may also resume specific polling and return to step 114, or may initiate contention procedures, step 124.

FIG. 6 is a flow chart illustrating specific polling procedures for a secondary station, in an active state, of a preferred embodiment of the present invention. A secondary station in the active state may wait for a specific poll, step 202. A secondary station in the active state, which has received a SPoll with its identification or an address that it recognizes, will then transmit information consisting of a response to the primary station, such as application data, if any is available for transmission, step 206, or information or a response consisting of a negative acknowledgement ("or NAK") if there is no application data available, step 204. Upon completion of transmission of such information or response, the secondary station returns to its idle or waiting state, step 202. The amount of application data which may be transmitted in response to a SPoll is determined by other means. In addition, if communications with the primary station is lost or impaired, as may be indicated by information from the downstream channel, the secondary station may transition or change states, to an unresponsive state, step 208.

Returning to FIG. 5, upon receiving a response from the secondary station, such as application data or a NAK, the primary station will return to step 114 and obtain the address of the next secondary station to be specifically polled from the list of active secondary stations, and will repeat the process described above. If the primary station does not receive any information or other response (i.e., no response) after a predetermined period of time, however, then the contention access controller will be informed that the identified secondary station did not respond and, again, the next active secondary station will be polled, returning to step 114. The lack of a response may indicate, for example, that the particular secondary station has gone off line and has powered down. Based upon how often an active secondary station has repeatedly failed to respond to a sequence of specific polls addressed or identifying that secondary station, the contention access controller may decide to remove the active secondary station from the active database and place the station in the unresponsive database.

By monitoring the number of secondary stations in the active and unresponsive databases, the contention access controller may respond dynamically and determine how frequently to initiate contention access procedures to attempt to establish communications with unresponsive secondary stations. When the contention access controller determines that it shall attempt communication with unresponsive secondary stations, it will command the polling controller to initiate contention access procedures, step 126 shown in FIG. 5, rather than continue with specific polling.

FIG. 7 is a flow chart illustrating contention access procedures for a primary station of a preferred embodiment of the present invention. Upon receiving a command to initiate contention access procedures, the polling controller will complete polling procedures for the active secondary station currently being polled, or will be in an idle state if such specific polling is already completed or unnecessary, step 302. The polling controller will then suspend specific polling procedures and commence contention access procedures by transmitting a general poll, abbreviated or referred to as a "GPoll", on the downstream channel, step 304. The polling controller will then wait for a response from the secondary stations, step 306. Unresponsive secondary stations that receive a GPoll, if able (for example, powered up), will transmit information, such as a response on the upstream channel requesting to become active. Having waited for a response from the secondary stations (step 306), the polling controller will determine if it has received information, such as a response, within a predetermined period of time, step 308. If the polling controller has not received information or a response of some kind within that time period, it will "timeout" and end the contention access process, step 320, and, for example, may recommence specific polling.

Each secondary station which responded to the GPoll will then wait to receive, on the downstream channel, a Spoll containing its address as an indication from the primary station that its response to the GPoll was received correctly and that they are now active. Correspondingly, the primary station determines if it has received information from a secondary station, step 308 of FIG. 7, and, if it has received information, the primary station determines if the information was a response requesting transfer to active status, step 310 of FIG. 7. Continuing to refer to FIG. 7, if a valid response such as a transfer request was received following transmission of a GPoll, then the polling controller will transmit a SPoll to that secondary station confirming that the response was received correctly and that the secondary station is now active, step 312. The polling controller will inform the contention access controller of the valid response, and the contention access controller will add the secondary device to the active database and remove it from the unresponsive database, step 314.

Continuing to refer to FIG. 7, step 310, if an invalid response is received by the primary station following transmission of a GPoll, then it may be assumed that more that one secondary station transmitted a response to the GPoll and that a data or response collision may have occurred or resulted, step 316. The primary station will then transmit a general poll for collision resolution, abbreviated or referred to herein as a "GPoll-CR", step 318. The collision resolution procedures are discussed in more detail below with regard to FIG. 8. Continuing to refer to FIG. 7, however, once the primary station has transmitted a GPoll-CR, the primary station will wait for a response to the GPoll-CR, returning to step 306. Again, as discussed above, the primary station will determine both if it has received a response, step 308, and if it has received a valid response such as a transfer request, step 310, and if so, continuing with steps 312 and 314 to transfer the secondary station to an active status and update the corresponding database.

Figure 8:
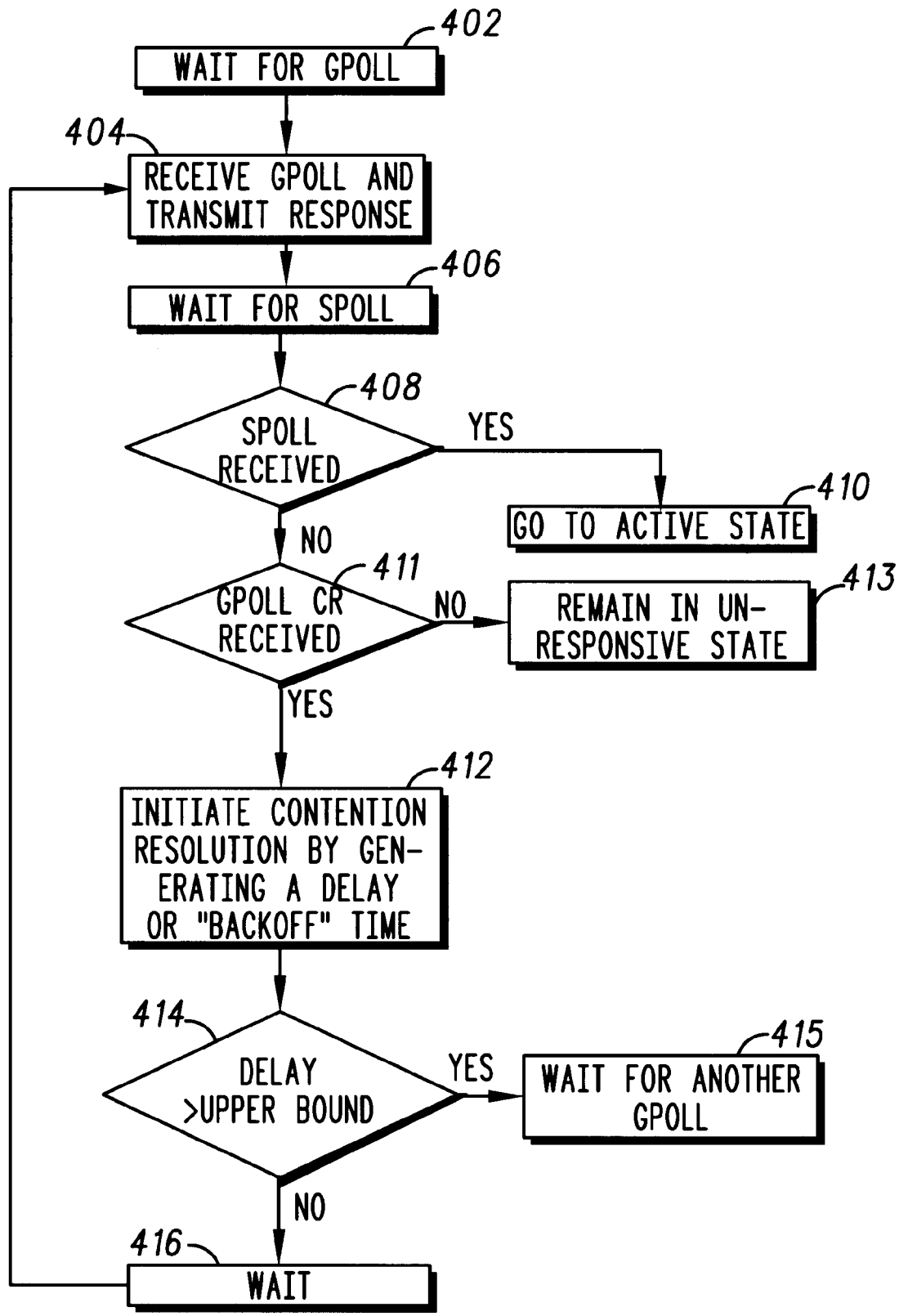
FIG. 8 is a flow chart illustrating hybrid polling and contention procedures for a secondary station, in an unresponsive state, of a preferred embodiment of the present invention.

FIG. 8 is a flow chart illustrating in greater detail the hybrid polling and contention procedures for a secondary station, in an unresponsive state, of a preferred embodiment of the present invention. As discussed in reference to FIG. 7, in the event that the polling controller has detected a response which is invalid, a collision of responses is presumed to have occurred. In such case, the polling controller will transmit, on the downstream channel, another type of poll previously mentioned and referred to as a General Poll for Collision Resolution ("GPoll-CR"). Any secondary station that had previously transmitted a response to a GPoll, and which then receives a GPoll-CR from the primary station, will then initiate collision resolution procedures as indicated in FIG. 8.

Referring to FIG. 8, a secondary station in an unresponsive state which then, for example, has been powered up in order to enter the network in an active state, will then wait for a GPoll to begin contention access procedures, step 402. Upon receiving a GPoll, the secondary station will transmit a response, step 404. The secondary station will then wait for another poll from the primary station, either an SPoll with the proper identification of the secondary station, or a GPoll-CR indicating that the previous response of the secondary station to the GPoll collided with that of another secondary station or a plurality of other secondary stations, step 406. If the secondary station receives an SPoll in step 408, the secondary station transitions to an active state, step 410. If the secondary station does not receive an SPoll and instead receives a GPoll-CR in step 408, the secondary station initiates collision resolution procedures. Correspondingly, the other secondary stations which had also responded to the GPoll and which received a GPoll-CR will also initiate contention resolution procedures, and will be a contending secondary station. Each such contending secondary station will initiate collision resolution procedures by generating a delay time period or "backoff time", step 412. The delay period or backoff time may be generated randomly, for example, in the preferred embodiment, or by using any type of desired algorithm which would tend to generate a non-duplicative, distinct, or different amount of time for each contending secondary station involved in the collision resolution procedures. The delay period may also be generated randomly between predetermined upper and lower limits such as, for example, the amount of time necessary to transmit a data frame or data packet. The backoff time will be a period of time, predetermined or random, for which the contending secondary station will delay its transmission of its response to the GPoll-CR. Accordingly, in the preferred embodiment of the invention, each such contending secondary station will have generated a different or distinct backoff time, some of which will be for a relatively greater period of time or a relatively lesser period of time, and presumably one of which will be for the smallest period of delay time. As indicated in FIG. 8, in one variation of the preferred embodiment, step 414, if the backoff time is greater than a predetermined upper bound, then that station will no longer contend during that episode of contention resolution and will not retransmit its GPoll response, but will rather wait for another GPoll before responding, i.e., will wait for another episode of contention access. The lower bound may be chosen to be the appropriate amount of time for transmission of a response to the GPoll-CR and the receipt of a concomitant SPoll, to avoid potential additional collisions at a later and undesirable time. If the backoff time is less than the upper bound, then it will wait that amount of time, step 416, and then retransmit its GPoll response, step 404, and again wait for an SPoll, step 406. This procedure will continue until the contending secondary station has, in fact, gained access to the network as an active secondary station.

As another contention variation not shown in FIG. 8, the various contending secondary stations may simply wait the corresponding backoff times, and at each such time, the secondary station will transmit its response. Presumably, the primary station will respond to the first such response transmitted to it by the corresponding secondary stations, allow that secondary station to have active status, and have the remaining contending stations contend again in a next or subsequent episode of contention procedures.

As discussed above, only unresponsive secondary stations that had just responded to a GPoll may then respond to a GPoll-CR. The polling controller in the primary station will continue to wait for and process all valid and invalid responses in the manner described above, until no further or additional responses are received after a predetermined period of time (or "timeout"). The polling controller will then inform the contention access controller that no more secondary stations are responding or have responded. The contention access controller may then command the polling controller at this time to initiate additional contention access procedures or to initiate specific polling procedures. In this manner, the polling controller may be dynamically responsive to the network load, providing greater or lesser contention access procedures to meet the possibly varying requirements of the network. For example, during periods in which many secondary stations may be powered up in order to access the network in an active state, the contention access controller may institute contention procedures relatively more frequently and repeatedly, compared to periods of lesser contention demand.

Accordingly, as shown in FIGS. 1–8, there is disclosed a method of controlling (or providing) access to a network for information transmission and reception, the network having a primary station coupleable to a plurality of secondary stations via a communications channel, each of the plurality of secondary stations having an active state and an unresponsive state, the method comprising: (a) providing network access to a first secondary station of the plurality of secondary stations in an active state by transmitting a specific poll from the primary station, the specific poll containing an identification of the first secondary station of the plurality of secondary stations in an active state; (b) the primary station receiving information, in response to the specific poll, from the first secondary station in an active state identified in the specific poll; (c) transmitting a general poll from the primary station to at least one of the plurality of secondary stations in an unresponsive state; (d) receiving information from any of the plurality of secondary stations in an unresponsive state in response to the general poll; (e) determining whether the information received in step (d), in response to the general poll, is a transfer request from a second identified secondary station in an unresponsive state to transfer to an active state, and in the event that the information received is a transfer request from a second identified secondary station, transfering the second identified secondary stations in an unresponsive state, to an active state, and providing network access to the transferred, second identified secondary station; (f) dynamically determining the frequency of repetition of steps (a) and (b), relative to the frequency of repetition of steps (c) through (e), inclusive; and (g) repeating steps (a) and (b) and steps (c) through (e), inclusive, in relative proportion to the dynamically determined relative frequency. The method of the various embodiments of the invention may further comprise: (h) maintaining a first database of addresses of the plurality of secondary stations which may be in an active state; (i) maintaining a second database of addresses of the plurality of secondary stations which may be in an unresponsive state. In addition, the method of the various embodiments of the invention may further include revising the first database and the second database in response to the information received in response to the specific poll; and revising the first database and the second database in response to the information received in response to the general poll.

The preferred embodiment of the present invention further comprises determining whether the information received by the primary station in response to the general poll is collision information and, if so, transmitting a general poll for collision resolution from the primary station to at least one of the plurality of secondary stations in an unresponsive state; receiving information from at least one of the plurality of secondary stations in an unresponsive state which had responded to the preceding general poll of step (d); and determining whether the information received in response to the general poll for collision resolution is a request from a third identified secondary station in an unresponsive state to transfer to an active state, and in the event that the information received is the transfer request from a third identified secondary station, transfering the third identified secondary stations in an unresponsive state, to an active state, and providing network access to the transferred, third identified secondary station. The preferred embodiment may also include revising the first database and the second database in response to the information received in response to the general poll for collision resolution.

Also as discussed in detail above, the various collision resolution procedures of the preferred embodiment of the present invention may include delaying a transmission of information, in response to the general poll for collision resolution, from at least one of the plurality of secondary stations which had responded to the preceding general poll, for a period of time. The period of time may be determined randomly, may be determined randomly between an upper limit and a lower limit, or may be determined by the period of time to transmit a data packet or data frame.

The preferred embodiment may also include determining whether the information received in response to a specific poll constitutes no response information, i.e., effectively no information whatsoever; transferring a secondary station, from which no response information was received repeatedly in response to sequential specific polls identifying the secondary station, from an active state to an unresponsive state; and revising the first database and the second database in response to the no response information received in response to the specific poll. In addition, the preferred embodiment of the present invention includes determining which of the plurality of secondary stations are in an active state by accessing the first database; determining whether the information received in response to a specific poll is a frame of data or a data packet; determining whether the information received in response to the specific poll is a negative acknowledgement; and determining whether the information received by the primary station in response to the general poll is no response information.

Other embodiments of the present invention may include singular rather than plural databases, such that the method of the present invention includes maintaining a database containing addresses of the plurality of secondary stations, the database further containing data identifying which of the plurality of secondary stations may be in an unresponsive state and which of the plurality of secondary stations may be in an active state; and revising the database in response to information received in response to any of a plurality of polls transmitted by the primary station.

Also as discussed above, the various advantages of the embodiments of the present invention include dynamically determining the relative frequency of transmission of specific polls and general polls by: increasing the relative frequency of transmission of specific polls in response to increasing network data transmission to the primary station; increasing the relative frequency of transmission of general polls in response to decreasing network data transmission to the primary station; or, increasing the relative frequency of transmission of general polls in response to an increasing frequency of collision information received in response to a plurality of general polls.

In another variation of the invention described herein, a frequency division or channel approach may be employed rather than a time division approach discussed above in reference to FIGS. 1–8, or in combination with a time division approach. Referring to FIG. 1, the downstream channel 18 and the upstream channel 20 may be physically combined, for example, as one coaxial cable or twisted pair. Each such physical transmission line may have a transmission bandwidth, which may be comprised of a plurality of communications channels (also referred to as "channels"), each having a predetermined bandwidth at non-overlapping frequencies. For example, a first such channel may have a 3 kHz bandwidth in a first frequency range or band from 3 kHz to 6 kHz, a second channel may also have a 3 kHz bandwidth in a second frequency range or band from 6 kHz to 9 kHz, a third channel may also have a 3 kHz bandwidth in a third frequency range or band from 9 kHz to 12 kHz, and so on. In this manner, the communications medium may be comprised of a plurality of downstream and upstream communications channels, each of which may have a predetermined bandwidth in a predetermined frequency range or band.

In an embodiment of the invention, for example, the plurality of channels for the upstream direction may have an approximate bandwidth of 600 kHz, throughout the 5 to 42 MHz frequency range, approximately, of the electromagnetic communications spectrum. In addition, planning for an asymmetric data communications model having possibly greater data transmission in the downstream direction, the plurality of downstream communications channels may each have a 6 MHz bandwidth, throughout the 50 to 750 MHz frequency range, approximately.

Figure 9:
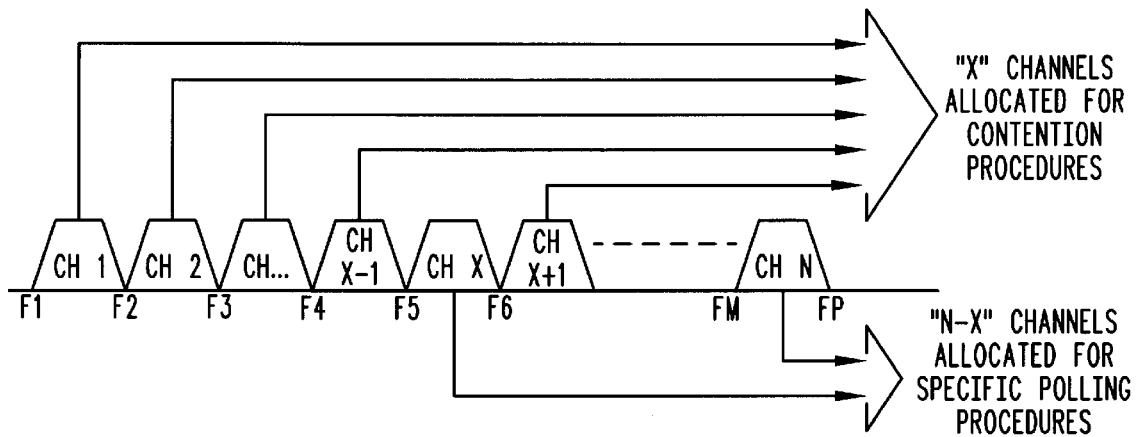
FIG. 9 is a schematic diagram illustrating a plurality of frequency channels comprising the available bandwidth of the entire transmission line.

In accordance with the invention described herein, each such frequency channel may be employed for specific polling procedures, for contention access procedures, or for both specific polling and contention access procedures. In addition, each such channel may also employ such time division procedures discussed above. FIG. 9 is a schematic diagram illustrating a plurality of frequency channels comprising the available bandwidth of the entire transmission line. Referring to FIG. 9, the transmission line is divided into a plurality of (n) total frequency channels. As shown in FIG. 9, there may be (n-x) channels dedicated for specific polling procedures, and (x) channels dedicated for contention access procedures. Similarly, the proportion or percentage of such channels allocated for specific polling or for contention access may be varied responsively to network demands or otherwise varied dynamically in response to the potentially changing transmission requirements of the network.

Figure 10:
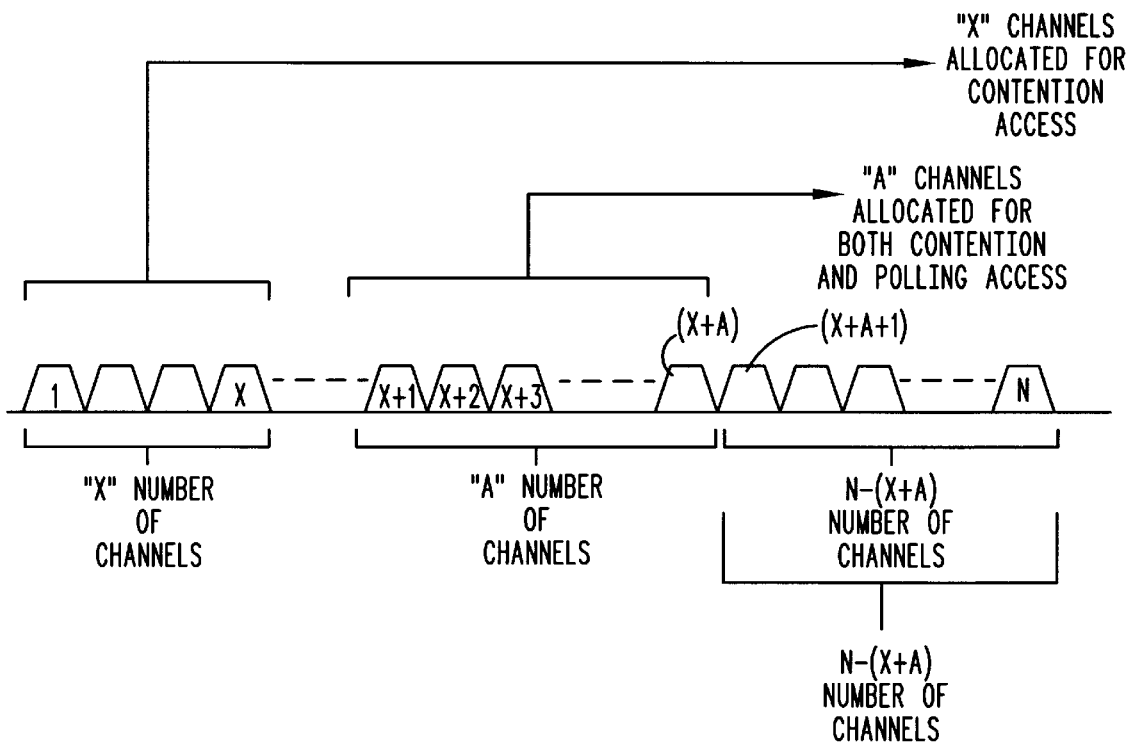
FIG. 10 is a schematic diagram illustrating a plurality of frequency channels comprising the available bandwidth of the entire transmission line, in conjunction with various time division procedures.

FIG. 10 is a schematic diagram illustrating a plurality of frequency channels comprising the available bandwidth of the entire transmission line, in conjunction with the various time division procedures discussed in detail above. As shown in FIG. 10, there may be (n-(x+a)) channels dedicated for specific polling procedures, and (x) channels dedicated for contention access procedures, and (a) channels in which both specific polling and contention access procedures may be employed. Similarly, the proportion or percentage of such channels allocated for specific polling, for contention access, or for combined contention access and specific polling, may be varied responsively to network demands or otherwise varied dynamically in response to the potentially changing transmission requirements of the network.

As shown in FIGS. 1–10, the various embodiments of the present invention include a method of controlling or providing access to a network for information transmission and reception, the network having a primary station coupleable to a plurality of secondary stations via a communications medium, the communications medium having a plurality of communications channels, each of the plurality of secondary stations having an active state and an unresponsive state, the method comprising: (a) providing network access to a first secondary station of the plurality of secondary stations in an active state by transmitting a specific poll from the primary station, on a first communications channel of the plurality of communications channels, the specific poll containing an identification of the first secondary station of the plurality of secondary stations in an active state; (b) the primary station receiving information on a second communications channel of the plurality of communications channels, in response to the specific poll, from the first secondary stations in an active state identified in the specific poll; (c) transmitting a general poll from the primary station, on a third communications channel of the plurality of communications channels, to at least one of the plurality of secondary stations in an unresponsive state; (d) receiving information, on a fourth communications channel of the plurality of communications channels, from any of the plurality of secondary stations in an unresponsive state in response to the general poll; (e) determining whether the information received in step (d), in response to the general poll, is a transfer request from a second identified secondary station in an unresponsive state to transfer to an active state, and in the event that the information received is a transfer request from a second identified secondary station, transfering the second identified secondary stations in an unresponsive state, to an active state, and providing network access to the transferred, second identified secondary station on at least one of the plurality of communications channels; (f) dynamically determining the frequency of repetition of steps (a) and (b), relative to the frequency of repetition of steps (c) through (e), inclusive; and (g) repeating steps (a) and (b) and steps (c) through (e), inclusive, in relative proportion to the dynamically determined relative frequency The various first, second, third, fourth, etc., communications channels, for example, may be separate and distinct, or may be combined in any permutation or combination. For example, the first communications channel may be the same as and include the second and fourth channels.

In this embodiment of the invention, moreover, the collision resolution procedures may also include determining whether the information received by the primary station in response to the general poll is collision information, transmitting a general poll for collision resolution from the primary station, on a fifth communications channel of the plurality of communications channels, to at least one of the plurality of secondary stations in an unresponsive state; receiving information, on a sixth communications channel of the plurality of communications channels, from at least one of the plurality of secondary stations in an unresponsive state which had responded to the preceding general poll of step (d); and determining whether the information received in response to the general poll for collision resolution is a request from a third identified secondary station in an unresponsive state to transfer to an active state, and in the event that the information received is the transfer request from a third identified secondary station, transfering the third identified secondary stations in an unresponsive state, to an active state, and providing network access to the transferred, third identified secondary station on at least one channel of the plurality of communications channels.

This embodiment of the present invention also may include various ways or means of optimizing network performance by dynamically determining the relative frequency of transmission of specific polls and general polls by: increasing the relative frequency of transmission of specific polls in response to increasing network data transmission to the primary station; increasing the relative frequency of transmission of general polls in response to decreasing network data transmission to the primary station; increasing the relative frequency of transmission of general polls in response to an increasing frequency of collision information received in response to a plurality of general polls; increasing the relative proportion of the plurality of communications channels allocated for the transmission of specific polls in response to increasing network data transmission to the primary station; increasing the relative proportion of the plurality of communications channels allocated for the transmission of general polls in response to decreasing network data transmission to the primary station; and increasing the relative proportion of the plurality of communications channels allocated for the transmission of general polls in response to an increasing frequency of collision information received in response to a plurality of general polls.

In the interests of brevity, other features of this embodiment of the present invention which may be the same as or similar to those previously mentioned have not been repeated herein, such as database structure, database revision in response to the various polls available, delaying and determining the delay time of secondary stations in the collision resolution process, changing a secondary station from an active status to an unresponsive status in response to repeatedly receiving no response information, and the various other features and advantages previously discussed.

Various features of the apparatus embodiments may also be described in detail. For example, an apparatus for controlling or providing access to a network for information transmission and reception, the network having a primary station coupleable to a plurality of secondary stations via a communications channel, each of the plurality of secondary stations having an active state and an unresponsive state, each of the plurality of secondary stations further having a distinct address, the primary station having a receiver coupleable to the communications channel for the reception of information from the plurality of secondary stations, the primary station further having a transmitter coupleable to the communications channel for the transmission of information to the plurality of secondary stations; the network access controlling apparatus comprising:

a first memory storing a first database, the first database containing the addresses of a plurality of secondary stations in an active state;

a second memory storing a second database, the second database containing the addresses of a plurality of secondary stations in an unresponsive state; and a controller, the controller coupled to the first memory and to the second memory, the controller coupleable to the receiver and to the transmitter, the controller providing network access to a first secondary station of the plurality of secondary stations in an active state by transmitting a specific poll, the specific poll containing an address of the first secondary station of the plurality of secondary stations in an active state, and by receiving information, in response to the specific poll, from the first secondary station in an active state identified in the specific poll; the controller further providing network access to a second secondary station of the plurality of secondary stations in an unresponsive state by transmitting a general poll to at least one of the plurality of secondary stations in an unresponsive state, by receiving information from any of the plurality of secondary stations in an unresponsive state in response to the general poll, by determining whether the information received, in response to the general poll, is a transfer request from a second identified secondary station in an unresponsive state to transfer to an active state, and in response to a transfer request from a second identified secondary station, the controller transfering the second identified secondary stations in an unresponsive state, to an active state; the controller further responsive to the information received to dynamically determine the frequency of transmission of a plurality of specific polls relative to the frequency of transmission of a plurality of general polls, the controller further responsive to transmit a plurality of specific polls and general polls in relative proportion to the dynamically determined relative frequency.

As discussed above, the controller of the preferred apparatus embodiment of the present invention may be embodied in a variety of forms. For example, the controller may be a microcontroller, a processor, a microprocessor, or may be part of a larger device such as a computer, a workstation, a personal computer, etc. In addition, the apparatus may be distributed among a variety of physically separate devices. For example, the apparatus may be wholly contained within the primary station itself, may be partially contained within the primary station and various accessory devices, and may also be distributed into aspects of the secondary station. The time delay circuit discussed herein, for example, may be embodied as hardware, firmware, or software, and may be included as part of the hardware and programming of a secondary station or a primary station, or their components.

As mentioned above with regard to the method aspects of the various embodiments of the present invention, the memory circuitry may also have a variety of forms, and may be separate, distributed, or combined with other elements and features. For example, the first memory having the first database and the second memory having the second database may, in fact, be part of one memory circuit. The memory aspects of the apparatus may also be embodied in various forms, such as RAM, ROM, EPROM, in discrete components, as an integrated circuit, or as part of a larger integrated circuit such as a microprocessor.

The preferred embodiment of the apparatus may also include having the controller be further responsive to the information received in response to the specific poll to revise the first database stored in the first memory and the second database stored in the second memory; having the controller be further responsive to the information received in response to the general poll to revise the first database stored in the first memory and the second database stored in the second memory.

In the preferred embodiment, the controller of the apparatus may also determine whether the information received in response to the general poll is collision information. In response to collision information, the controller transmits a general poll for collision resolution to at least one of the plurality of secondary stations in an unresponsive state; the controller further providing network access to a third secondary station by receiving information from at least one of the plurality of secondary stations in an unresponsive state which had responded to the preceding general poll, and determining whether the information received in response to the general poll for collision resolution is a request from a third identified secondary station in an unresponsive state to transfer to an active state, and in response to the transfer request from a third identified secondary station, the controller transfering the third identified secondary station in an unresponsive state, to an active state. The controller may be further responsive to the information received in response to the general poll for collision resolution to revise the first database stored in the first memory and the second database stored in the second memory. The controller may also determine which of the plurality of secondary stations are in an active state by accessing the first memory and retrieving an address from the first database.

The preferred embodiment may also include a time delay circuit, the time delay circuit delaying a transmission of information, in response to the general poll for collision resolution, from at least one of the plurality of secondary stations which had responded to the preceding general poll, for a period of time. The time delay circuit may randomly determine the period of time, may randomly determine the period of time between an upper limit and a lower limit, or may determine the period of time based upon the period of time to transmit a data packet or data frame.

The controller may also be configured to perform any of the various features previously discussed. For example, the controller, in response to the information received in response to the specific poll, determines whether the information received is no response information. The controller further, in response to repeatedly receiving no response information in response to sequential specific polls identifying a secondary station, transfers the secondary station from an active state to an unresponsive state, and revises the first database and the second database in response to the no response information received in response to the specific poll. The controller may also further determine whether the information received in response to the specific poll is a frame of data, whether the information received in response to the specific poll is a negative acknowledgement, and whether the information received in response to the general poll is no response information.

The controller may also contain internal hardware, such as an arithmetic logic unit, which may be used to optimize network performance based upon network usage and network demands. For example, the controller may determine the relative frequency of transmission of specific polls and general polls by optimizing various parameters, such as by: increasing the relative frequency of transmission of specific polls in response to increasing network data transmission to the primary station; increasing the relative frequency of transmission of general polls in response to decreasing network data transmission to the primary station; increasing the relative frequency of transmission of general polls in response to an increasing frequency of collision information received in response to a plurality of general polls; increasing the relative proportion of the plurality of communications channels allocated for the transmission of specific polls in response to increasing network data transmission to the primary station; increasing the relative proportion of the plurality of communications channels allocated for the transmission of general polls in response to decreasing network data transmission to the primary station; and increasing the relative proportion of the plurality of communications channels allocated for the transmission of general polls in response to an increasing frequency of collision information received in response to a plurality of general polls.

In summary, the preferred embodiment of the present invention may include a method of controlling or providing access to a network for information transmission and reception, the network having a primary station coupleable to a plurality of secondary stations via a communications medium, each of the plurality of secondary stations having an active state and an unresponsive state, the method comprising:

(a) maintaining a first database of addresses of the plurality of secondary stations which may be in an active state;

(b) maintaining a second database of addresses of the plurality of secondary stations which may be in an unresponsive state;

(c) determining which of the plurality of secondary stations are in an active state by accessing the first database and retrieving a first identifying address of a first secondary station of the plurality of secondary stations in an active state;

(d) providing network access to a first secondary station of the plurality of secondary stations in an active state by transmitting a specific poll from the primary station, the specific poll containing the first identifying address;

(e) the primary station receiving information, in response to the specific poll, from the first secondary station in an active state identified in the specific poll;

(f) determining whether the information received in response to the specific poll is a frame of data;

(g) determining whether the information received in response to the specific poll is a negative acknowledgement;

(h) revising the first database and the second database in response to the information received in response to the specific poll;

(i) transmitting a general poll from the primary station to at least one of the plurality of secondary stations in an unresponsive state;

(j) receiving information from any of the plurality of secondary stations in an unresponsive state in response to the general poll;

(k) determining whether the information received in step (j), in response to the general poll, is a transfer request from a second identified secondary station in an unresponsive state to transfer to an active state, and in the event that the information received is a transfer request from a second identified secondary station, transfering the second identified secondary stations in an unresponsive state, to an active state and providing network access to the transferred, second identified secondary station, and revising the first database and the second database in response to the transfer request;

(l) determining whether the information received in step (j), in response to the general poll, is collision information, and in the event that the information received is collision information, transmitting a general poll for collision resolution from the primary station to at least one of the plurality of secondary stations in an unresponsive state; delaying a transmission of information, in response to the general poll for collision resolution, from at least one of the plurality of secondary stations which had responded to the preceding general poll, for a randomly determined period of time between an upper limit and a lower limit; receiving information from at least one of the plurality of secondary stations in an unresponsive state which had responded to the preceding general poll of step (i); determining whether the information received in response to the general poll for collision resolution is a request from a third identified secondary station in an unresponsive state to transfer to an active state, and in the event that the information received is the transfer request from a third identified secondary station, transfering the third identified secondary stations in an unresponsive state, to an active state, providing network access to the transferred, third identified secondary station, and revising the first database and the second database in response to the information received in response to the general poll for collision resolution;

(m) dynamically determining the frequency of repetition of steps (c) through (h), inclusive, relative to the frequency of repetition of steps (i) through (l), inclusive, by optimizing the relative frequency based upon the parameters of: (m1) increasing the relative frequency of transmission of specific polls in response to increasing network data transmission to the primary station; (m2) increasing the relative frequency of transmission of general polls in response to decreasing network data transmission to the primary station; (m3) increasing the relative frequency of transmission of general polls in response to an increasing frequency of collision information received in response to a plurality of general polls; (m4) increasing the relative proportion of the plurality of communications channels allocated for the transmission of specific polls in response to increasing network data transmission to the primary station; (m5) increasing the relative proportion of the plurality of communications channels allocated for the transmission of general polls in response to decreasing network data transmission to the primary station; and (m6) increasing the relative proportion of the plurality of communications channels allocated for the transmission of general polls in response to an increasing frequency of collision information received in response to a plurality of general polls;

(n) repeating steps (c) through (h), inclusive, and steps (i) through (l), inclusive, in relative proportion to the dynamically determined relative frequency; and (o) determining whether the information received in response to the specific poll constitutes no response information, transferring a secondary station, from which no response information was received repeatedly in response to sequential specific polls identifying the secondary station, from an active state to an unresponsive state, and revising the first database and the second database in response to the no response information received in response to the specific poll.

Those skilled in the art will recognize the many advantages of the embodiments of the present invention over network protocols currently in use. First, the present invention provides improved network performance by reducing the amount of time and bandwidth expended accessing unresponsive secondary stations. Second, the present invention provides a more efficient approach for accessing unresponsive secondary stations than is available with existing protocols employing a polling discipline.

Moreover, a centrally controlled (within the primary station) contention access discipline coupled with the specific polling protocol allows for a less complex, and therefore more economical, implementation of secondary stations. Because there are usually far greater numbers of secondary stations than primary stations in computer or communications networks, the overall network implementation may be more efficient and economical. Conversely, contention access disciplines are typically implemented in a distributed fashion, where there may be no distinction between primary and secondary stations, requiring all such stations to be equally complex and presumably more expensive and less efficient.

A centrally controlled contention access discipline also allows for the relative mix of polling and contention disciplines to be dynamically altered in response to different network conditions (i.e., contention access procedures will be operating more frequently when there is a great number of unresponsive secondary stations, and less frequently as the number of unresponsive stations decreases relative to the number of active stations). In the prior art, this dynamic allocation is either not possible or highly complex with a distributed implementation.

Lastly, the centrally concentrated intelligence, via the implementation of the primary station, allows for the subsequent implementation and deployment of more complex and sophisticated algorithms employed by the contention access controller and the polling controller, without requiring upgrades to secondary stations. This provides a much more economical and efficient means for performing network upgrades and enhancements than is possible with networks where the protocol intelligence is distributed.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of controlling access to a network for information transmission and reception, the network having a primary station coupleable to a plurality of secondary stations via a communications channel, each of the plurality of secondary stations having an active state and an unresponsive state, the method comprising:

(a) providing network access to a first secondary station of the plurality of secondary stations in an active state by transmitting a specific poll from the primary station, the specific poll containing an identification of the first secondary station of the plurality of secondary stations in an active state;

(b) the primary station receiving information, in response to the specific poll, from the first secondary station in an active state identified in the specific poll;

(c) simultaneously transmitting a general poll from the primary station to at least two of the plurality of secondary stations in an unresponsive state;

(d) receiving information from any of the plurality of secondary stations in an unresponsive state in response to the general poll;

(e) determining whether the information received in step (d), in response to the general poll, is a transfer request from a second identified secondary station in an unresponsive state to transfer to an active state, and in the event that the information received is a transfer request from a second identified secondary station, transfering the second identified secondary station in an unresponsive state, to an active state, and providing network access to the transferred, second identified secondary station;

(f) dynamically determining the frequency of repetition of steps (a) and (b), relative to the frequency of repetition of steps (c) through (e), inclusive; and (g) repeating steps (a) and (b) and steps (c) through (e), inclusive, in relative proportion to the dynamically determined relative frequency.

2. The method of claim 1, further comprising:

(h) maintaining a first database of addresses of the plurality of secondary stations which may be in an active state;

(i) maintaining a second database of addresses of the plurality of secondary stations which may be in an unresponsive state.

3. The method of claim 2, further comprising:

(j) revising the first database and the second database in response to the information received in response to the specific poll.

4. The method of claim 2, further comprising:

(j) revising the first database and the second database in response to the information received in response to the general poll.

5. The method of claim 2, wherein step (a) further comprises:

determining which of the plurality of secondary stations are in an active state by accessing the first database.

6. The method of claim 2, wherein step (e) further comprises:

determining whether the information received by the primary station in response to the general poll is collision information.

7. The method of claim 2, wherein step (b) further comprises:

determining whether the information received in response to the specific poll constitutes no response information.

8. The method of claim 7, further comprising;

transferring a secondary station, from which no response information was received repeatedly in response to sequential specific polls identifying the secondary station, from an active state to an unresponsive state; and revising the first database and the second database in response to the no response information received in response to the specific poll.

9. The method of claim 1, wherein step (b) further comprises:

determining whether the information received in response to the specific poll is a frame of data.

10. The method of claim 1, wherein step (b) further comprises:

determining whether the information received in response to the specific poll is a negative acknowledgement.

11. The method of claim 1, wherein step (e) further comprises:

determining whether the information received by the primary station in response to the general poll is collision information;

transmitting a general poll for collision resolution from the primary station to at least one of the plurality of secondary stations in an unresponsive state, in the event that the information received by the primary station in response to the general poll is collision information;

receiving information from at least one of the plurality of secondary stations in an unresponsive state which had responded to the preceding general poll of step (d); and determining whether the information received in response to the general poll for collision resolution is a request from a third identified secondary station in an unresponsive state to transfer to an active state, and in the event that the information received is the transfer request from a third identified secondary station, transfering the third identified secondary stations in an unresponsive state, to an active state, and providing network access to the transferred, third identified secondary station.

12. The method of claim 1, wherein step (e) further comprises:

determining whether the information received by the primary station in response to the general poll is no response information.

13. The method of claim 1, further comprising:

(g) maintaining a database containing addressess of the plurality of secondary stations, the database further containing data identifying which of the plurality of secondary stations may be in an unresponsive state and which of the plurality of secondary stations may be in an active state; and (h) revising the database in response to information received in response to any of a plurality of polls transmitted by the primary station.

14. The method of claim 1 wherein step (f) further comprises:

dynamically determining the relative frequency of transmission of specific polls and general polls by increasing the relative frequency of transmission of specific polls in response to increasing network data transmission to the primary station.

15. The method of claim 1 wherein step (f) further comprises:

dynamically determining the relative frequency of transmission of specific polls and general polls by increasing the relative frequency of transmission of general polls in response to decreasing network data transmission to the primary station.

16. The method of claim 1 wherein step (f) further comprises:

dynamically determining the relative frequency of transmission of specific polls and general polls by increasing the relative frequency of transmission of general polls in response to an increasing frequency of collision information received in response to a plurality of general polls.

17. A method of controlling access to a network for information transmission and reception, the network having a primary station coupleable to a plurality of secondary stations via a communications channel, each of the plurality of secondary stations having an active state and an unresponsive state, the method comprising;

(a) providing network access to a first secondary station of the plurality of secondary stations in an active state by transmitting a specific poll from the primary station, the specific poll containing an identification of the first secondary station of the plurality of secondary stations in active state;

(b) the primary station receiving information, in response to the specific poll, from the first secondary station in an active state identified in the specific poll;

(c) transmitting a general poll from the primary station to at least one of the plurality of secondary stations in an unresponsive state;

(d) receiving information from any of the plurality of secondary stations in an unresponsive state in response to the general poll;

(e) determining whether the information received in step (d), in response to the general poll, is a transfer request from a second identified secondary station in an unresponsive state to transfer to an active state, and in the event that the information received is a transfer request from a second identified secondary station, transferring the second identified secondary station in an unresponsive state, to an active state, and providing network access to the transferred, second identified secondary station;

(f) dynamically determining the frequency of repetition of steps (a) and (b), relative to the frequency of repetition of steps (c) through (e), inclusive;

(g) repeating steps (a) and (b) and steps (c) through (e), inclusive, in relative proportion to the dynamically determined relative frequency;

(h) maintaining a first database of addresses of the plurality of secondary stations which may be in an active state;

(i) maintaining a second database of addresses of the plurality of secondary station which may be in an unresponsive state; and wherein step (e) further comprising determining whether the information received by the primary station in response to the general poll is collision information;

(j) transmitting a general poll for collision resolution from the primary station to at least one of the plurality of secondary stations in an unresponsive state;

(k) receiving information from at least on of the plurality of secondary stations in an unresponsive state which had responded to the preceeding general poll of step (d); and (l) determining whether the information received in response to the general poll for collision resolution is a request from a third identified secondary station in an unresponsive state to transfer to an active state, and in the event that the information received is the transfer request from a third identified secondary station, transferring the third identified secondary station in an unresponsive state, to an active state, and providing network access to the transferred, third identified secondary station.

18. The method of claim 17, further comprising:
(j) revising the first database and the second database in response to the information received in response to the general poll for collision resolution.

19. The method of claim 17, further comprising:
delaying a transmission of information, in response to the general poll for collision resolution, from at least one of the plurality of secondary stations which had responded to the preceding general poll, for a period of time.

20. The method of claim 19 wherein the period of time is determined randomly.

21. The method of claim 19 wherein the period of time is determined by the period of time to transmit a data frame.

22. The method of claim 19 wherein the period of time is determined randomly between an upper limit and a lower limit.

23. A method of controlling a network for information transmission and reception, the network having a primary station coupleable to a plurality of secondary stations via a communications medium, the communications medium having a plurality of communications channels, each of the plurality of secondary stations having an active state and an unresponsive state, the method comprising:

(a) providing network access to a first secondary station of the plurality of secondary stations in an active state by transmitting a specific poll from the primary station, on a first communications channel of the plurality of communications channels, the specific poll containing an identification of the first secondary station of the plurality of secondary stations in an active state;

(b) the primary station receiving information on a second communications channel of the plurality of communications channels, in response to the specific poll, from the first secondary stations in an active state identified in the specific poll;

(c) simultaneously transmitting a general poll from the primary station, on a third communications channel of the plurality of communications channels, to at least two of the plurality of secondary stations in an unresponsive state;

(d) receiving information, on a fourth communications channel of the plurality of communications channels, from any of the plurality of secondary stations in an unresponsive state in response to the general poll;

(e) determining whether the information received in step (d), in response to the general poll, is a transfer request from a second identified secondary station in an unresponsive state to transfer to an active state, and in the event that the information received is a transfer request from a second identified secondary station, transfering the second identified secondary stations in an unresponsive state, to an active state, and providing network access to the transferred, second identified secondary station on at least one of the plurality of communications channels;

(f) dynamically determining the frequency of repetition of steps (a) and (b), relative to the frequency of repetition of steps (c) through (e), inclusive; and (g) repeating steps (a) and (b) and steps (c) through (e), inclusive, in relative proportion to the dynamically determined relative frequency.

24. The method of claim 23, further comprising:
(h) maintaining a first database of addresses of the plurality of secondary stations which may be in an active state;
(i) maintaining a second database of addresses of the plurality of secondary stations which may be in an unresponsive state.

25. The method of claim 24, further comprising:
(j) revising the first database and the second database in response to the information received in response to the specific poll.

26. The method of claim 24, further comprising:
(j) revising the first database and the second database in response to the information received in response to the general poll.

27. The method of claim 24, wherein step (a) further comprises:
determining which of the plurality of secondary stations are in an active state by accessing the first database.

28. The method of claim 24, wherein step (e) further comprises:
determining whether the information received by the primary station in response to the general poll is collision information.

29. The method of claim 28, further comprising:
transmitting a general poll for collision resolution from the primary station, on a fifth communications channel of the plurality of communications channels, to at least one of the plurality of secondary stations in an unresponsive state;

receiving information, on a sixth communications channel of the plurality of communications channels, from at least one of the plurality of secondary stations in an unresponsive state which had responded to the preceding general poll of step (d); and determining whether the information received in response to the general poll for collision resolution is a request from a third identified secondary station in an unresponsive state to transfer to an active state, and in the event that the information received is the transfer request from a third identified secondary station, transfering the third identified secondary stations in an unresponsive state, to an active state, and providing network access to the transferred, third identified secondary station on at least one channel of the plurality of communications channels.

30. The method of claim 29, further comprising:

(j) revising the first database and the second database in response to the information received in response to the general poll for collision resolution.

31. The method of claim 29, further comprising:

delaying a transmission of information on the sixth communications channel of the plurality of communications channels, in response to the general poll for collision resolution, from at least one of the plurality of secondary stations which had responded to the preceding general poll, for a period of time.

32. The method of claim 31 wherein the period of time is determined randomly.

33. The method of claim 31 wherein the period of time is determined by the period of time to transmit a data packet.

34. The method of claim 31 wherein the period of time is determined randomly between an upper limit and a lower limit.

35. The method of claim 24, wherein step (b) further comprises:

determining whether the information received in response to the specific poll constitutes no response information.

36. The method of claim 35, further comprising;

transferring a secondary station, from which no response information was received repeatedly in response to sequential specific polls identifying the secondary station, from an active state to an unresponsive state; and revising the first database and the second database in response to the no response information received in response to the specific poll.

37. The method of claim 23, wherein step (b) further comprises:

determining whether the information received in response to the specific poll is a frame of data.

38. The method of claim 23, wherein step (b) further comprises:

determining whether the information received in response to the specific poll is a negative acknowledgement.

39. The method of claim 23, wherein step (e) further comprises:

determining whether the information received by the primary station in response to the general poll is collision information;

transmitting a general poll for collision resolution from the primary station, on a fifth communications channel of the plurality of communications channels, to at least one of the plurality of secondary stations in an unresponsive state, in the event that the information received by the primary station in response to the general poll is collision information;

receiving information, on a sixth communications channel of the plurality of communications channels, from at least one of the plurality of secondary stations in an unresponsive state which had responded to the preceding general poll of step (d); and determining whether the information received in response to the general poll for collision resolution is a request from a third identified secondary station in an unresponsive state to transfer to an active state, and in the event that the information received is the transfer request from a third identified secondary station, transfering the third identified secondary stations in an unresponsive state, to an active state, and providing network access to the transferred, third identified secondary station on at least one communications channel of the plurality of communications channels.

40. The method of claim 23, wherein step (e) further comprises:

determining whether the information received by the primary station in response to the general poll is no response information.

41. The method of claim 23, further comprising:

(g) maintaining a database containing addresses of the plurality of secondary stations, the database further containing data identifying which of the plurality of secondary stations may be in an unresponsive state and which of the plurality of secondary stations may be in an active state; and (h) revising the database in response to information received in response to any of a plurality of polls transmitted by the primary station.

42. The method of claim 23 wherein step (f) further comprises:

dynamically determining the relative frequency of transmission of specific polls and general polls by increasing the relative frequency of transmission of specific polls in response to increasing network data transmission to the primary station.

43. The method of claim 23 wherein step (f) further comprises:

dynamically determining the relative frequency of transmission of specific polls and general polls by increasing the relative frequency of transmission of general polls in response to decreasing network data transmission to the primary station.

44. The method of claim 23 wherein step (f) further comprises:

dynamically determining the relative frequency of transmission of specific polls and general polls by increasing the relative frequency of transmission of general polls in response to an increasing frequency of collision information received in response to a plurality of general polls.

45. The method of claim 23 wherein step (f) further comprises:

dynamically determining the relative frequency of transmission of specific polls and general polls by increasing the relative proportion of the plurality of communications channels allocated for the transmission of specific polls in response to increasing network data transmission to the primary station.

46. The method of claim 23 wherein step (f) further comprises:

dynamically determining the relative frequency of transmission of specific polls and general polls by increasing the relative proportion of the plurality of communications channels allocated for the transmission of general polls in response to decreasing network data transmission to the primary station.

47. The method of claim 23 wherein step (f) further comprises:

dynamically determining the relative frequency of transmission of specific polls and general polls by increasing the relative proportion of the plurality of communications channels allocated for the transmission of general polls in response to an increasing frequency of collision information received in response to a plurality of general polls.

48. An apparatus for controlling access to a network for information transmission and reception, the network having a primary station coupleable to a plurality of secondary stations via a communications medium, the communications medium having a plurality of communications channels, each of the plurality of secondary stations having an active state and an unresponsive state, each of the plurality of secondary stations further having a distinct address, the primary station having a receiver coupleable to at least one of the plurality of communications channel for the reception of information from the plurality of secondary stations, the primary station further having a transmitter coupleable to at least one of the plurality of communications channels for the transmission of information to the plurality of secondary stations; the network access controlling apparatus comprising:

a first memory storing a first database, the first database containing the addresses of a plurality of secondary stations in an active state;

a second memory storing a second database, the second database containing the addresses of a plurality of secondary stations in an unresponsive state; and a controller, the controller coupled to the first memory and to the second memory, the controller coupleable to the receiver and to the transmitter, the controller providing network access to a first secondary station of the plurality of secondary stations in an active state by transmitting a specific poll, the specific poll containing an address of the first secondary station of the plurality of secondary stations in an active state, and by receiving information, in response to the specific poll, from the first secondary stations in an active state identified in the specific poll; the controller further providing network access to a second secondary station of the plurality of secondary stations in an unresponsive state by simultaneously transmitting a general poll to at least two of the plurality of secondary stations in an unresponsive state, by receiving information from any of the plurality of secondary stations in an unresponsive state in response to the general poll, by determining whether the information received, in response to the general poll, is a transfer request from a second identified secondary station in an unresponsive state to transfer to an active state, and in response to a transfer request from a second identified secondary station, the controller transfering the second identified secondary stations in an unresponsive state, to an active state; the controller further responsive to the information received to dynamically determine the frequency of transmission of a plurality of specific polls relative to the frequency of transmission of a plurality of general polls, the controller further responsive to transmit a plurality of specific polls and general polls in relative proportion to the dynamically determined relative frequency.

49. The apparatus of claim 48, wherein:
the controller is further responsive to the information received in response to the specific poll to revise the first database stored in the first memory and the second database stored in the second memory.

50. The apparatus of claim 48, wherein:
the controller is further responsive to the information received in response to the general poll to revise the first database stored in the first memory and the second database stored in the second memory.

51. The apparatus of claim 48, wherein:
the controller determines which of the plurality of secondary stations are in an active state by accessing the first memory and retrieving an address from the first database.

52. The apparatus of claim 48, wherein:
the controller further determines whether the information received in response to the general poll is collision information.

53. The apparatus of claim 52, wherein:
the controller, in response to collision information, transmits a general poll for collision resolution to at least one of the plurality of secondary stations in an unresponsive state; the controller further providing network access to a third secondary station by receiving information from at least one of the plurality of secondary stations in an unresponsive state which had responded to the preceding general poll, and determining whether the information received in response to the general poll for collision resolution is a request from a third identified secondary station in an unresponsive state to transfer to an active state, and in response to the transfer request from a third identified secondary station, the controller transfering the third identified secondary station in an unresponsive state, to an active state.

54. The apparatus of claim 53, wherein:
the controller is further responsive to the information received in response to the general poll for collision resolution to revise the first database stored in the first memory and the second database stored in the second memory.

55. The apparatus of claim 53, further comprising:
a time delay circuit, the time delay circuit delaying a transmission of information, in response to the general poll for collision resolution, from at least one of the plurality of secondary stations which had responded to the preceding general poll, for a period of time.

56. The apparatus of claim 55 wherein the time delay circuit randomly determines the period of time.

57. The apparatus of claim 55 wherein the period of time is determined by the period of time to transmit a data packet.

58. The apparatus of claim 55 wherein the period of time is determined randomly between an upper limit and a lower limit.

59. The apparatus of claim 48, wherein:
the controller, in response to the information received in response to the specific poll, determines whether the information received is no response information.

60. The apparatus of claim 59, wherein:
the controller further, in response to repeatedly receiving no response information in response to sequential specific polls identifying a secondary station, transfers the secondary station from an active state to an unresponsive state, and revises the first database and the second database in response to the no response information received in response to the specific poll.

61. The apparatus of claim 48, wherein:

the controller further determines whether the information received in response to the specific poll is a frame of data.

62. The apparatus of claim 48, wherein:

the controller further determines whether the information received in response to the specific poll is a negative acknowledgement.

63. The apparatus of claim 48, wherein:

the controller further determines whether the information received by the primary station in response to the general poll is collision information;

the controller, in response to receiving collision information, transmits a general poll for collision resolution from the primary station to at least one of the plurality of secondary stations in an unresponsive state, the controller further providing network access to a third secondary station by receiving information from at least one of the plurality of secondary stations in an unresponsive state which had responded to the preceding general poll, and determining whether the information received in response to the general poll for collision resolution is a request from a third identified secondary station in an unresponsive state to transfer to an active state, and in response to the transfer request from a third identified secondary station, the controller transfering the third identified secondary station in an unresponsive state, to an active state.

64. The apparatus of claim 48, wherein:

the controller further determines whether the information received in response to the general poll is no response information.

65. The apparatus of claim 48, wherein:

the controller further dynamically determines the relative frequency of transmission of specific polls and general polls by increasing the relative frequency of transmission of specific polls in response to increasing network data transmission to the primary station.

66. The apparatus of claim 48, wherein the controller further dynamically determines the relative frequency of transmission of specific polls and general polls by increasing the relative frequency of transmission of general polls in response to decreasing network data transmission to the primary station.

67. The apparatus of claim 48, wherein:

the controller further dynamically determines the relative frequency of transmission of specific polls and general polls by increasing the relative frequency of transmission of general polls in response to an increasing frequency of collision information received in response to a plurality of general polls.

68. The apparatus of claim 48, wherein:

the controller further dynamically determines the relative frequency of transmission of specific polls and general polls by increasing the relative proportion of the plurality of communications channels allocated for the transmission of specific polls in response to increasing network data transmission to the primary station.

69. The apparatus of claim 48, wherein:

the controller further dynamically determines the relative frequency of transmission of specific polls and general polls by increasing the relative proportion of the plurality of communications channels allocated for the transmission of general polls in response to decreasing network data transmission to the primary station.

70. The apparatus of claim 48, wherein:

the controller further dynamically determines the relative frequency of transmission of specific polls and general polls by increasing the relative proportion of the plurality of communications channels allocated for the transmission of general polls in response to an increasing frequency of collision information received in response to a plurality of general polls.

71. A method of controlling access to a network for information transmission and reception, the network having a primary station coupleable to a plurality of secondary stations via a communications medium, each of the plurality of secondary stations having an active state and an unresponsive state, the method comprising:

(a) maintaining a first database of addresses of the plurality of secondary stations which may be in an active state;

(b) maintaining a second database of addresses of the plurality of secondary stations which may be in an unresponsive state;

(c) determining which of the plurality of secondary stations are in an active state by accessing the first database and retrieving a first identifying address of a first secondary station of the plurality of secondary stations in an active state;

(d) providing network access to a first secondary station of the plurality of secondary stations in an active state by transmitting a specific poll from the primary station, the specific poll containing the first identifying address;

(e) the primary station receiving information, in response to the specific poll, from the first secondary station in an active state identified in the specific poll;

(f) determining whether the information received in response to the specific poll is a frame of data;

(g) determining whether the information received in response to the specific poll is a negative acknowledgement;

(h) revising the first database and the second database in response to the information received in response to the specific poll;

(i) transmitting a general poll from the primary station to at least one of the plurality of secondary stations in an unresponsive state;

(j) receiving information from any of the plurality of secondary stations in an unresponsive state in response to the general poll;

(k) determining whether the information received in step (j), in response to the general poll, is a transfer request from a second identified secondary station in an unresponsive state to transfer to an active state, and in the event that the information received is a transfer request from a second identified secondary station, transfering the second identified secondary stations in an unresponsive state, to an active state and providing network access to the transferred, second identified secondary station, and revising the first database and the second database in response to the transfer request;

(l) determining whether the information received in step (j), in response to the general poll, is collision information, and in the event that the information received is collision information, transmitting a general poll for collision resolution from the primary station to at least one of the plurality of secondary stations in an unresponsive state; delaying a transmission of information, in response to the general poll for collision resolution, from at least one of the plurality of secondary stations which had responded to the preceding general poll, for a randomly determined period of time between an upper limit and a lower limit; receiving information from at least one of the plurality of secondary stations in an unresponsive state which had responded to the preceding general poll of step (i); determining whether the information received in response to the general poll for collision resolution is a request from a third identified secondary station in an unresponsive state to transfer to an active state, and in the event that the information received is the transfer request from a third identified secondary station, transfering the third identified secondary station in an unresponsive state, to an active state, providing network access to the transferred, third identified secondary station, and revising the first database and the second database in response to the information received in response to the general poll for collision resolution;

(m) dynamically determining the frequency of repetition of steps (c) through (h), inclusive, relative to the frequency of repetition of steps (i) through (i), inclusive, by optimizing the relative frequency based upon the parameters of: (m1) increasing the relative frequency of transmission of specific polls in response to increasing network data transmission to the primary station; (m2) increasing the relative frequency of transmission of general polls in response to decreasing network data transmission to the primary station; (m3) increasing the relative frequency of transmission of general polls in response to an increasing frequency of collision information received in response to a plurality of general polls; (m4) increasing the relative proportion of the plurality of communications channels allocated for the transmission of specific polls in response to increasing network data transmission to the primary station; (m5) increasing the relative proportion of the plurality of communications channels allocated for the transmission of general polls in response to decreasing network data transmission to the primary station; and (m6) increasing the relative proportion of the plurality of communications channels allocated for the transmission of general polls in response to an increasing frequency of collision information received in response to a plurality of general polls;

(n) repeating steps (c) through (h), inclusive, and steps (i) through (l), inclusive, in relative proportion to the dynamically determined relative frequency; and (o) determining whether the information received in response to the specific poll constitutes no response information, transferring a secondary station, from which no response information was received repeatedly in response to sequential specific polls identifying the secondary station, from an active state to an unresponsive state, and revising the first database and the second database in response to the no response information received in response to the specific poll.

* * * * *

UNITED STATES PATENT AND TRADEMARK OFFICE
CERTIFICATE OF CORRECTION

PATENT NO. : 6,006,017            Page 1 of 1
DATED : December 21, 1999
INVENTOR(S) : Abhay Joshi, Mete Kabatepe, Lawrence W. Lloyd, John A. Perreault, Stephen Schroeder It is certified that error appears in the above-identified patent and that said Letters Patent is hereby corrected as shown below:

Column 23,
Line 58 of claim 23, after "controlling", insert -- access to --

Signed and Sealed this

Twenty-eighth Day of August, 2001

*Attest:*

NICHOLAS P. GODICI
*Attesting Officer*     *Acting Director of the United States Patent and Trademark Office*